(No Model.)
F. D'A. GOOLD.
SYSTEM OF ELECTRICAL DISTRIBUTION.
No. 565,740. Patented Aug. 11, 1896.
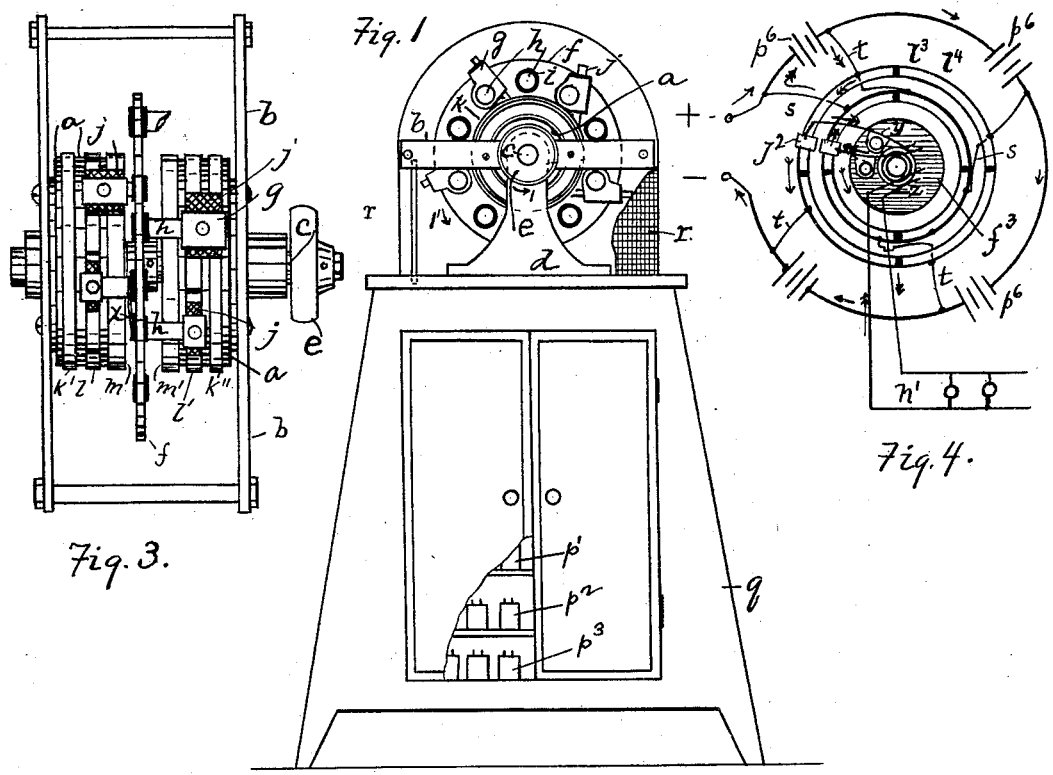
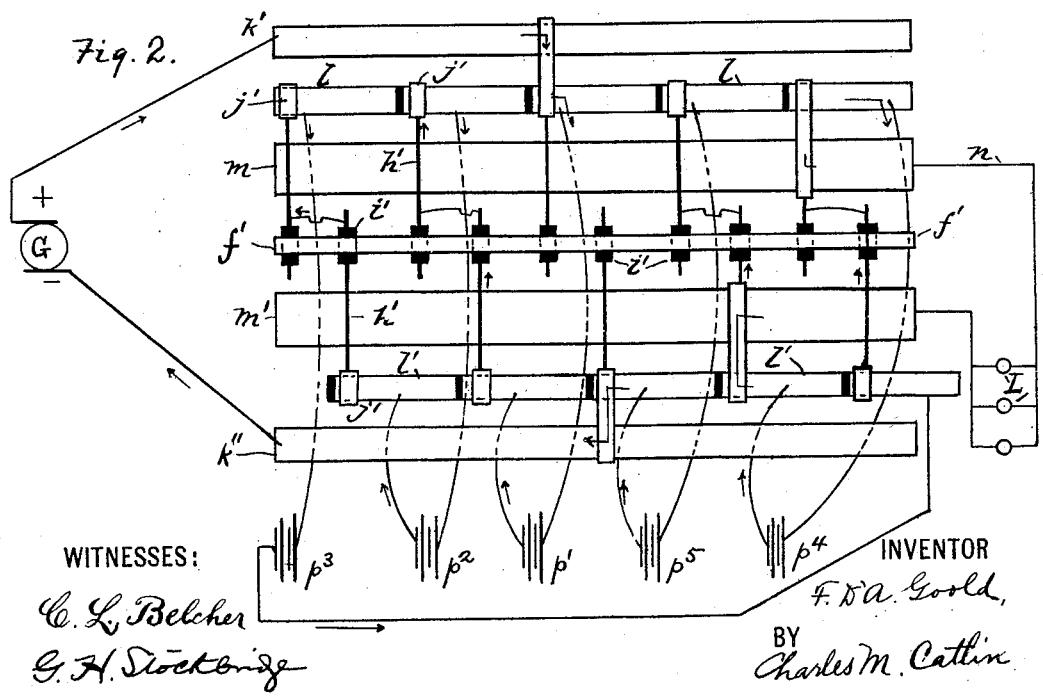
WITNESSES:
C. L. Belcher
G. H. Stockbridge
INVENTOR
F. D'A. Goold,
BY
Charles M. Catlin
ATTORNEY

UNITED STATES PATENT OFFICE.

FREDERICK D'A. GOOLD, OF NEW YORK, N. Y., ASSIGNOR, BY MESNE ASSIGNMENTS, TO THE GENERAL ELECTRIC COMPANY, OF NEW YORK.

SYSTEM OF ELECTRICAL DISTRIBUTION.

SPECIFICATION forming part of Letters Patent No. 565,740, dated August 11, 1896.

Application filed November 2, 1895. Serial No. 567,695. (No model.)

*To all whom it may concern:*

Be it known that I, FREDERICK D'A. GOOLD, a citizen of the United States, and a resident of New York, county of New York, and State of New York, have invented certain new and useful Improvements in Transformer Systems, of which the following is a specification.

My invention relates to transformer systems and apparatus whereby high-tension currents can be utilized for low-tension work.

In general terms the system consists of several secondary-battery or storage cells, preferably in groups, a high-tension continuous-current generator at a point more or less distant from the point of consumption and from the commutator or circuit-changer, a consumption-circuit requiring comparatively low-tension current, and a commutator or circuit-changer adapted to keep all of the cells continuously connected in series to the high-tension charging-circuit, and to connect the cells in successive groups to the consumption-circuit. The circuit-changer and circuit connections are such that when the groups of cells are connected successively to the consumption-circuit the series connection of all the cells is maintained. The group of cells so connected to the consumption-circuit remains in the series circuit, but is connected by a shunt connection to the consumption-circuit, so that it can discharge momentarily into it, which it does without interfering with the operation of charging the other cells.

In the drawings, Figure 1 is an end elevation, with parts broken away, of the preferred circuit-changer and cabinet for the cells. Fig. 2 is a diagram showing circuit connections and the contact-strips of the circuit-changer as developed from the cylinder of the circuit-changer. Fig. 3 is a plan view of the circuit-changer, and Fig. 4 is a diagram of a modified system.

In Fig. 1, $a$ is an insulating-cylinder held from rotation by connection to frame $b$. $c$ is a shaft through the axis of the cylinder, supported in bearings $d$, having a driving-pulley $e$, and having secured to it a brush-carrying disk $f$, as indicated by the arrows $l\ l'$. Said disk carries as many brush-holders $g$ on rods $h$, insulated from the disk by insulation $i$, and having brushes $j$ bearing on the contact-strips on the cylinder, as there are groups of cells. In the construction illustrated alternate brushes are on opposite sides of the disk.

In Fig. 2, $f'$ indicates the brush-carrying disk, $h'$ the rods insulated therefrom at $i'$, and $j'$ the brushes carried thereby. On the cylinder are several peripheral contact-rings and rows of segments, only one of which is shown in Fig. 1, namely, a continuous ring $k$, which corresponds to $k'$ of Fig. 2. To this ring is connected one pole of the high-tension continuous-current generator G. At the opposite end of the cylinder is a second ring $k''$, to which the other pole of the generator is connected. Alongside of each of these rings are series of contact-segments $l\ l'$, the segments of each series being separated by insulation not quite as long as the thickness of the brushes $j\ j'$, so that said brushes will make contact with an advance segment just before leaving the one it is on. There are as many segments in each series as groups of cells to be used. It is preferable to have the segments $l\ l'$ break joints.

$p'\ p^2\ p^3\ p^4\ p^5$ are storage-cells, the positive poles of each group being connected to the segments $l$ and the negative poles to segments $l'$. Parallel with these segments are two rings $m\ m'$, to which the consumption-circuit $n$, having translating devices, as lamps or motors L, requiring a comparatively low-tension current, is connected.

Between rings $m\ m'$ is the brush-carrying disk $f$ ($f'$), the cylinder $a$ being divided at its center and the two halves separated to admit the disk between them and to allow it to turn with the shaft $c$.

On each side of the disk $f$ are (in this case) five brushes, three only wide enough to make contact with one series of contacts and arranged over the segments $l\ l'$, one brush wide enough to and located to make contact with said segments and with an outer ring $k'$ or $k''$, and one brush connecting said segments to the ring $m$ or $m'$. The brushes are connected in pairs, except those which make contact with the outer rings, as shown in Fig. 2 and at $x$, Fig. 3. The number of groups of cells and of cells in each group may be varied as desired. Generally a much larger number of cells and of groups than shown would be used. I find that cells containing plain metallic lead plates (that is, plates not "formed") and a suitable liquid have marked advantages in this system over cells using formed plates. The circuit-changer connects the successive groups of cells momentarily to the consumption-circuit, so that they will discharge into it for a very brief period and will then be charged for a much longer period.

In Fig. 2 two circuits are traced by arrows, first, by single-headed arrows, the charging-circuit, beginning at the generator G, through all the cells $p'$ to $p^5$, in series, and back to the opposite side of the generator; second, by double-headed arrows, the consumption-circuit. In the condition of the circuit-changer indicated in Fig. 2, the group of cells $p^4$ only is discharging into the consumption-circuit, without, however, being disconnected from the series-charging circuit. As the brushes move forward the next group, $p^5$, will be connected to said circuit and group $p^4$ disconnected, and so on for the other groups. Thus, while the high-tension charging-current meets the resistance of a large number of cells in series, the consumption-circuit will receive a current due only a fraction of the cells. By maintaining the series connection of the cells at all times bad sparking is avoided.

It is preferred to arrange the cells in a cabinet $q$, which also supports the circuit-changing device, and over the latter is placed a wire-screen cover $r$.

With the connections above described the charging-circuit while being maintained closed is varied in the order of connection of the groups of cells, but this is not essential.

In Fig. 4 is a modified system in which the groups $p^6$ are permanently connected in a definite order in the charging-circuit, plus being the points where the charging-generator is connected, and the rotary brushes $j^2$ merely close a connection between the groups successively and consumption-circuit $n'$ through connections $s$ and $t$ and brushes $y$ $z$.

$f^3$ indicates a disk adapted to rotate and carry brushes $j^2$, insulated therefrom, over the segments $l^3$ $l^4$, to which the terminals or connections $s$ $t$ of the groups of cells are connected.

I claim—

1. The combination of a circuit conveying or adapted to convey a high-tension continuous current, a series of storage-cells in sections or groups, all of which cells are continuously connected in series to said high-tension circuit, a consumption-circuit requiring a current of lower tension than the charging-current, and a circuit-changer for connecting the cells in sections successively to the consumption-circuit and disconnecting them therefrom.

2. The combination of a circuit conveying or adapted to convey a high-tension continuous current, a series of cells, containing metallic, that is, "unformed" plates and a suitable liquid, in sections connected in series to the charging-circuit, a consumption-circuit, and a circuit-changer arranged to connect and disconnect the sections successively to and from the consumption-circuit.

3. The combination of several sections of storage-cells connected in series in a permanent order for charging, a consumption-circuit requiring a current of lower tension than the charging-current, and means independent of the series circuit for successively connecting the sections of cells to the consumption-circuit.

4. The combination in a circuit-changer of a rotatable shaft, a divided cylinder thereon, contact rings and segments on each part of the cylinder to which suitable circuit connections extend, a brush-carrying disk connected to the shaft between the parts of the cylinder, and brushes carried by the disk, some brushes connecting with said segments only and some with the segments and rings, as set forth.

Signed this 30th day of October, 1895.

FREDERICK D'A. GOOLD.

Witnesses:
 C. L. BELCHER,
 CHARLES M. CATLIN.